(12) United States Patent
Miyazono (10) Patent No.: US 9,798,128 B2
(45) Date of Patent: Oct. 24, 2017

(54) SCANNING MICROSCOPE (71) Applicant: OLYMPUS CORPORATION, Shibuya-ku, Tokyo (JP)

(72) Inventor: Yuya Miyazono, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 22 days.

(21) Appl. No.: 14/933,944

(22) Filed: Nov. 5, 2015

(65) Prior Publication Data
US 2016/0139395 A1 May 19, 2016

(30) Foreign Application Priority Data
Nov. 14, 2014 (JP) .................. 2014-231691

(51) Int. Cl.
G02B 21/16 (2006.01)
G02B 13/00 (2006.01)
G02B 21/00 (2006.01)
G02B 21/02 (2006.01)
G02B 27/14 (2006.01)

(52) U.S. Cl.
CPC ......... *G02B 21/16* (2013.01); *G02B 13/0095* (2013.01); *G02B 21/002* (2013.01); *G02B 21/025* (2013.01); *G02B 27/141* (2013.01)

(58) Field of Classification Search
CPC ... G02B 21/00–21/368; G02B 13/0095; G02B 13/22; G02B 27/10; G02B 27/14; G02B 27/141; G02B 27/142; G02B 27/144–27/146
See application file for complete search history.

(56) References Cited

U.S. PATENT DOCUMENTS

| 2003/0179370 A1* | 9/2003 | Goldberg | G02B 21/0016 356/237.2 |
| 2005/0207003 A1* | 9/2005 | Kobayashi | G02B 21/025 359/368 |
| 2009/0284835 A1* | 11/2009 | Meshulach | G02B 21/0068 359/486.01 |
| 2012/0050733 A1* | 3/2012 | Takimoto | G01J 3/44 356/301 |

FOREIGN PATENT DOCUMENTS

JP 2011022299 A 2/2011

* cited by examiner

*Primary Examiner* — Derek S Chapel
*Assistant Examiner* — Adam W Booher
(74) *Attorney, Agent, or Firm* — Holtz, Holtz & Volek PC (57) ABSTRACT A scanning microscope includes a scanner, an objective irradiates a sample with illumination light deflected by the scanner, and a beam splitter that is arranged between the objective and an exit pupil position, and that reflects one of the illumination light and observation light from the sample and transmits the other. The objective has the exit pupil position outside the objective.

4 Claims, 11 Drawing Sheets

SCANNING MICROSCOPE

CROSS REFERENCE TO RELATED APPLICATIONS

This application is based upon and claims the benefit of priority from prior Japanese Patent Application No. 2014-231691, filed Nov. 14, 2014, the entire contents of which are incorporated herein by this reference.

BACKGROUND OF THE INVENTION

1. Field of the Invention

The present invention relates to a scanning microscope.

2. Description of the Related Art

In recent years, as a microscope that enables the observation of a deep portion of a biological sample, a multi-photon excitation microscope that is represented by a two-photon excitation microscope has been attracting attention. The multi-photon excitation microscope is disclosed, for example, in Japanese Laid-Open Patent Publication No. 2011-022299.

An extremely high photon density is required for the occurrence of a multi-photon excitation phenomenon, and therefore, in a multi-photon excitation microscope utilizing the multi-photon excitation phenomenon, fluorescence is generated from one point (an extremely narrow range) in a sample. Accordingly, unlike a confocal microscope, the multi-photon excitation microscope does not need a descanning process for returning fluorescence to the same scanning optical path as that of excitation light so as to detect the fluorescence, and can detect the fluorescence without performing the descanning process. A detector that detects observation light (fluorescence) without the need for the descanning process in a scanning microscope is referred to as a "non-descanned detector". Detecting observation light (fluorescence) without the need for the descanning process is referred to as "non-descanned detection".

The multi-photon excitation microscope can also obtain a bright image of a sample in which fluorescence is scattered, by guiding fluorescence from as wide a range as possible of the sample to a non-descanned detector. Therefore, in order to also guide fluorescence that is made incident on an objective from the outside of an axis to a non-descanned detector, the non-descanned detector is usually arranged such that a light receiving surface is located on a plane that is optically conjugate with a pupil of the objective.

SUMMARY OF THE INVENTION

An aspect of the present invention provides a scanning microscope that includes a scanner that scans a sample with illumination light, an objective that externally has an exit pupil position and irradiates the sample with the illumination light deflected by the scanner, and a beam splitter that is arranged between the objective and the exit pupil position, and that reflects one of the illumination light and observation light from the sample and transmits the other.

BRIEF DESCRIPTION OF THE DRAWINGS

The present invention will be more apparent from the following detailed description when the accompanying drawings are referenced.

FIGS. 5A and 5B illustrate a ray of fluorescence detected by a PMT in a case in which the size of a dichroic mirror of a multi-photon excitation microscope illustrated in FIG. 1 is greater than an exit pupil diameter of an objective.

FIGS. 6A and 6B illustrate aperture efficiency in a case in which the size of a dichroic mirror of a multi-photon excitation microscope illustrated in FIG. 1 is greater than an exit pupil diameter of an objective.

FIGS. 7A and 7B illustrate a ray of fluorescence detected by a PMT in a case in which the size of a dichroic mirror of a multi-photon excitation microscope illustrated in FIG. 1 is approximately equal to an exit pupil diameter of an objective.

FIGS. 8A and 8B illustrate aperture efficiency in a case in which the size of a dichroic mirror of a multi-photon excitation microscope illustrated in FIG. 1 is approximately equal to an exit pupil diameter of an objective.

FIGS. 9A and 9B respectively illustrate examples in which an objective different from each other is included.

FIGS. 10A and 10B respectively illustrate examples in which an objective different from each other is included.

DESCRIPTION OF THE EMBODIMENTS

In a multi-photon excitation microscope, a beam splitter such as a dichroic mirror is arranged on an optical axis of an objective in order to split fluorescence (observation light) from excitation light (illumination light). The dichroic mirror sometimes reduces detection efficiency of fluorescence. This is because a ray of fluorescence emitted from a position apart from the optical axis of the objective (an off-axis position) among rays of fluorescence emitted from a sample is converted by the objective into a parallel light flux that is inclined with respect to the optical axis and the parallel light flux is emitted. The ray of fluorescence described above sometimes deviates from the dichroic mirror, and as a result, vignetting is generated.

In view of the foregoing, examples of the present invention are described below.

First Embodiment

Figure 1:
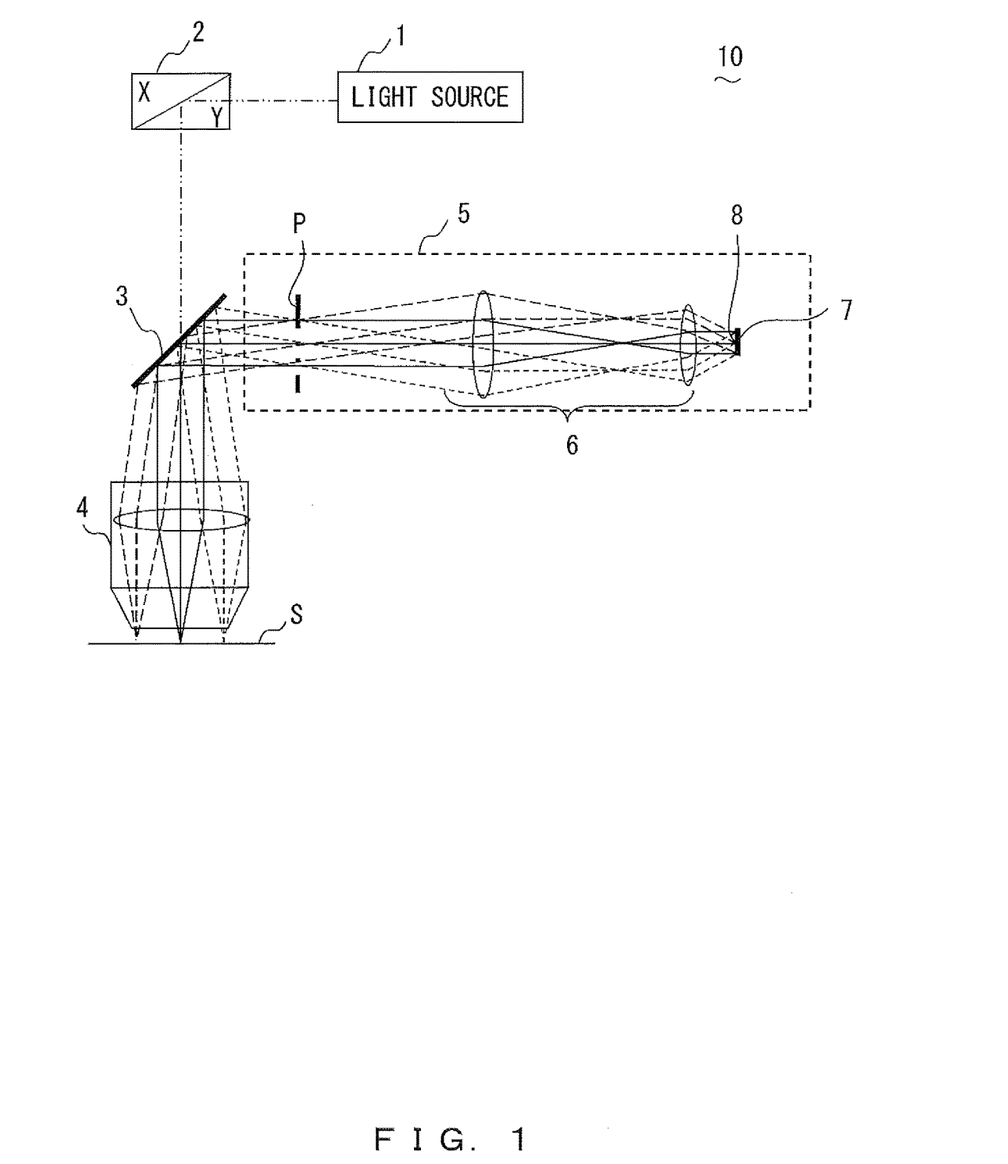
FIG. 1 illustrates a configuration of a multi-photon excitation microscope in first embodiment of the present invention.
Figure 2:
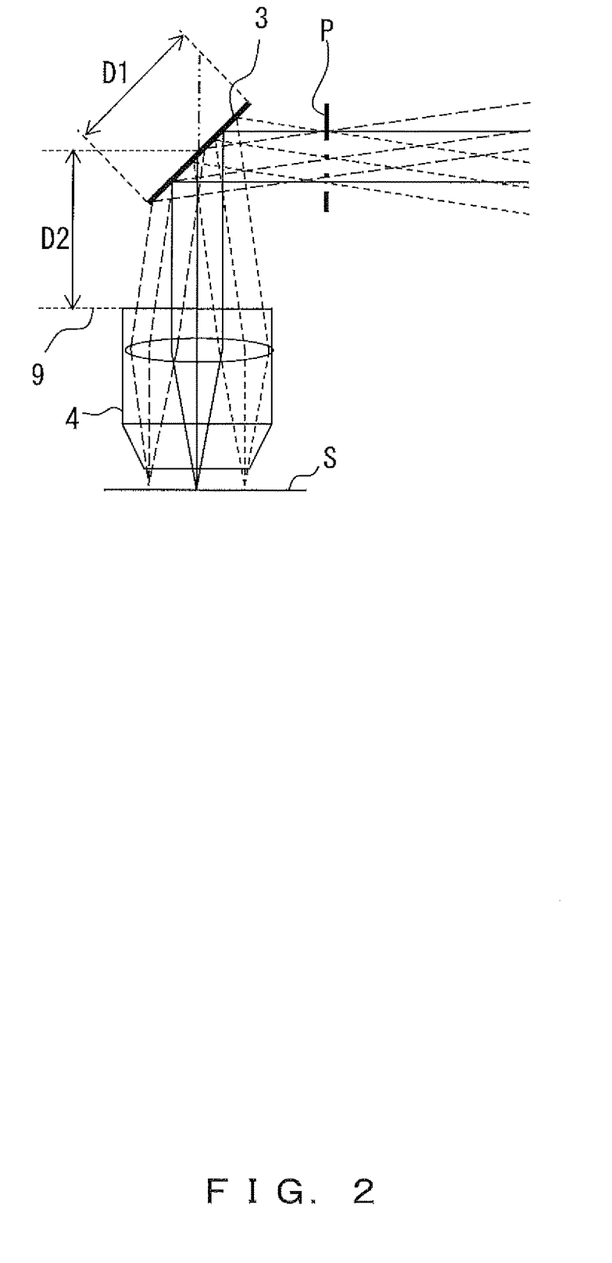
FIG. 2 is a diagram explaining the size and position of a dichroic mirror.
Figure 3:
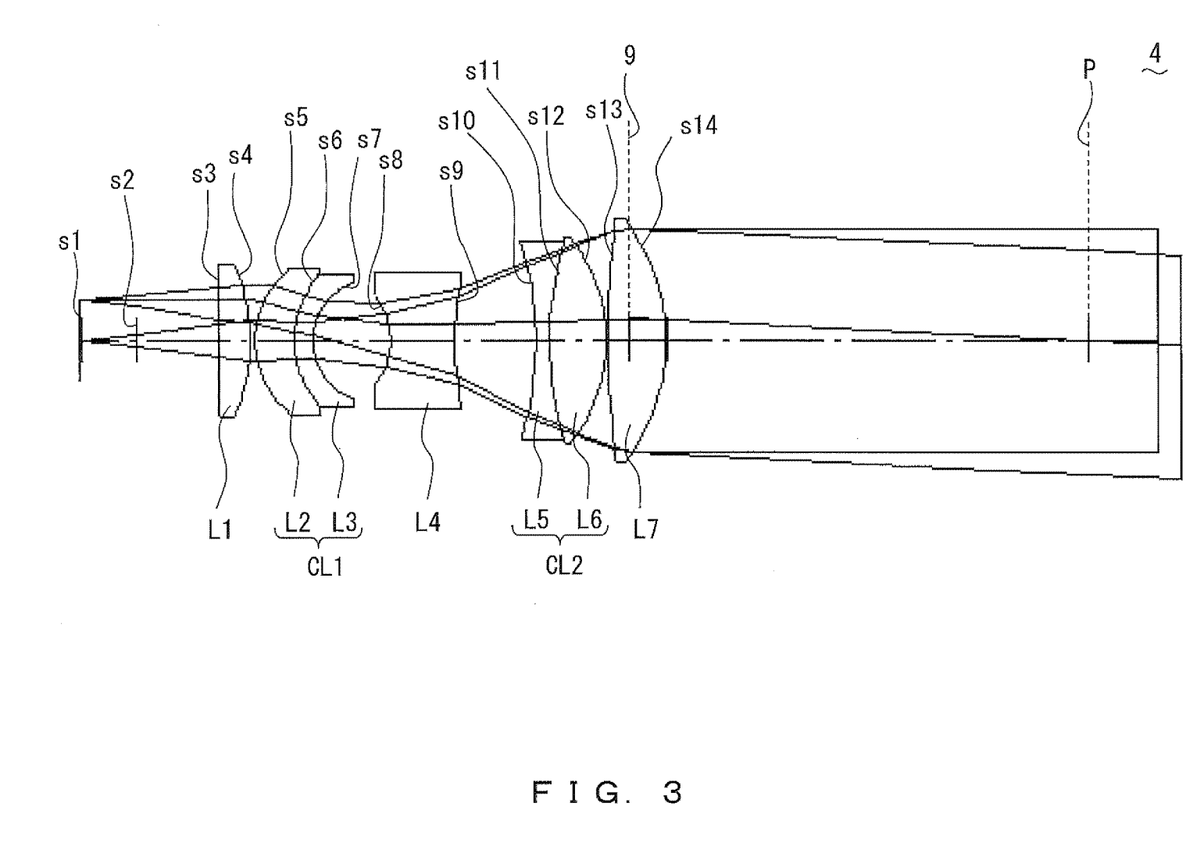
FIG. 3 is a sectional view of an objective illustrated in FIG. 1.

FIG. 1 illustrates a configuration of a multi-photon excitation microscope 10 in this embodiment. FIG. 2 is a diagram explaining the size and position of a dichroic mirror included in the multi-photon excitation microscope 10. FIG. 3 is a sectional view of an objective 4 included in the multi-photon excitation microscope 10.

The multi-photon excitation microscope 10 is a scanning microscope including a scanner (XY scanner 2). As illustrated in FIG. 1, the multi-photon excitation microscope 10 includes a light source 1, an XY scanner 2, a dichroic mirror 3, an objective 4, and a non-confocal detection unit 5. FIG. 1 and FIG. 2 illustrate a light flux of fluorescence detected by the multi-photon excitation microscope 10, in addition to components of the multi-photon excitation microscope 10. A light flux shown by a solid line is an on-axis light flux, and light fluxes shown by a broken line and a long broken line are off-axis light fluxes. In this case, the light flux is a flux of rays emitted from one point of an object (an object point), and is also referred to as a pencil of light.

The light source 1 is a light source that emits excitation light that is illumination light that illuminates a sample S. An example of the light source 1 is a light source that emits pulse light having an infrared wavelength, such as titanium sapphire laser, as excitation light.

The XY scanner 2 is a scanner that scans the sample S with excitation light in an XY direction orthogonal to an optical axis of the objective 4. Examples of the XY scanner 2 include a galvano-scanner and a resonant scanner. The XY scanner 2 is projected in an exit pupil position P of the objective by a relay optical system (not illustrated). Namely, the XY scanner 2 is arranged in a position that is optically conjugate with the exit pupil position P.

The dichroic mirror 3 is a beam splitter that splits excitation light from fluorescence that is observation light from the sample S. More specifically, the dichroic mirror 3 is a beam splitter that reflects one of excitation light and fluorescence and transmits the other. The dichroic mirror 3 has a spectral transmittance characteristic for transmitting excitation light and reflecting fluorescence. The dichroic mirror 3 is arranged on an optical path between the objective 4 and the exit pupil position P of the objective 4.

Hereinafter, it is assumed that D1 represents a length of one side of the dichroic mirror 3 and D2 represents a distance between an objective mounting plane 9 of the objective 4 and a position of the dichroic mirror 3, as illustrated in FIG. 2. The position of the dichroic mirror 3 is defined so as to be a position in which the optical axis of the objective 4 and the dichroic mirror 3 intersect. The size of the dichroic mirror 3 is defined so as to be a width of the dichroic mirror 3 (the XY direction) in a direction orthogonal to an optical axis, and is calculated by $D1/\sqrt{2}$.

The objective 4 is an infinity correction type objective, and has the exit pupil position P outside the objective 4. The objective 4 irradiates the sample S with excitation light that has been deflected by the XY scanner 2, and converts fluorescence from the sample S into a parallel light flux. In this case, the exit pupil position P is an exit pupil position of the objective 4 when the objective 4 is telecentric on an incidence side (the objective 4 has an entrance pupil at infinity).

As illustrated in FIG. 3, the objective 4 is configured of a plano-convex lens L1, a cemented lens CL1 that is configured of a meniscus lens L2 having positive power with a concave surface facing an image side and a meniscus lens L3 having negative power with a concave surface facing the image side, a biconcave lens L4, a cemented lens CL2 that is configured of a biconcave lens L5 and a biconvex lens L6, and a biconvex lens L7, in order from an object side.

A total magnification β of the objective 4 used in combination with a tube lens is 2 times, and a parfocal distance of the objective 4 is 60 mm. Lens data of the objective 4 is described below.

| Objective lens 4 | | | | | |
|---|---|---|---|---|---|
| s | r | d | nd | vd | Effective diameter |
| 1 | ∞ | 6.05 | 1.33304 | 55.79 | |
| 2 | ∞ | 9.00 | | | |
| 3 | ∞ | 3.50 | 1.51633 | 64.14 | 16.0 |
| 4 | 21.0497 | 0.50 | | | 16.0 |
| 5 | −10.5065 | 4.30 | 1.6779 | 55.34 | 15.0 |
| 6 | −11.3866 | 2.00 | 1.48749 | 70.23 | 13.0 |
| 7 | −7.024 | 8.50 | | | 10.0 |
| 8 | 7.801 | 7.00 | 1.58144 | 40.75 | 9.0 |
| 9 | −37.142 | 8.84 | | | 14.0 |
| 10 | 37.142 | 1.50 | 1.59551 | 39.24 | 21.0 |
| 11 | −40.593 | 6.20 | 1.43875 | 94.99 | 21.0 |
| 12 | 18.5902 | 0.20 | | | 22.0 |
| 13 | −121.955 | 6.30 | 1.48749 | 70.23 | 26.0 |
| 14 | 22.4011 | −3.90 | | | 25.0 |

In this lens data, s represents a surface number, r represents a radius of curvature (mm), d represents a spacing (mm), nd represents a refractive index to a d-line, and vd represents an Abbe number. It is assumed that a space between a surface having a surface number s1 and a surface having a surface number s2 is filled with the sample S (in this embodiment, a material equivalent to water), and that a space between a surface having a surface number s2 and a surface having a surface number s3 is an air space. Surfaces having surface numbers s3 and s14 respectively represent a lens surface closest to the object plane and a lens surface closest to an image plane in the objective 4. As an example, a spacing d1 represents a distance from a surface having a surface number s1 to a surface having a surface number s2. A spacing d14 represents a distance from a surface having a surface number s14 to the objective mounting plane 9. A distance from the objective mounting plane 9 to the exit pupil position P is 54.6 (mm).

The non-confocal detection unit 5 detects fluorescence without descanning. Namely, the non-confocal detection unit is a photo detection unit that performs non-descanned detection. The non-confocal detection unit 5 includes a relay optical system 6 and a photomultiplier tube (PMT) 7.

The relay optical system 6 is the first relay optical system that guides fluorescence to the PMT 7, and is arranged between the exit pupil position P and the PMT 7. The relay optical system 6 may project the light receiving surface 8 of the PMT 7 between the sample S and the exit pupil position P. As an example, the relay optical system 6 may project the light receiving surface 8 of the PMT 7 in the exit pupil position P, or may project the light receiving surface 8 between the objective 4 and the exit pupil position P.

The PMT 7 is a photo detector that detects fluorescence. The PMT 7 is a so-called non-descanned detector, and detects fluorescence via the objective 4 and the dichroic mirror 3, not via the XY scanner 2.

The multi-photon excitation microscope 10 enables vignetting of fluorescence caused by the dichroic mirror 3 to be effectively suppressed, because the dichroic mirror 3 is arranged between the objective 4 and the exit pupil position P. As a result, fluorescence detection efficiency is improved, and a bright image can be acquired. This point is described below in detail.

Because a principal ray from the sample S intersects an optical axis in the exit pupil position of an objective, it is generally considered that a light flux diameter (a diameter of the entirety of a light flux including on-axis light and off-axis light) from the sample S becomes minimum at the exit pupil position. On this premise, it is preferable that a dichroic mirror be arranged in the exit pupil position in order to suppress vignetting caused by the dichroic mirror. However, in a case in which the exit pupil position is located within the objective, it is impossible for the dichroic mirror to be arranged in the exit pupil position. Many objectives internally have the exit pupil position. In a case in which the exit pupil position is located outside the objective, it is possible for the dichroic mirror to be arranged in the exit pupil position. However, in such an objective, a light flux diameter from the sample S does not become minimum in the exit pupil position, and the light flux diameter becomes minimum in a position closer to the object plane than the exit pupil position. In many cases, the light flux diameter becomes minimum in a position immediately after the emission from the objective, such as an objective mounting plane of the objective. It is considered that this results from vignetting generated in the objective.

Figure 4A:
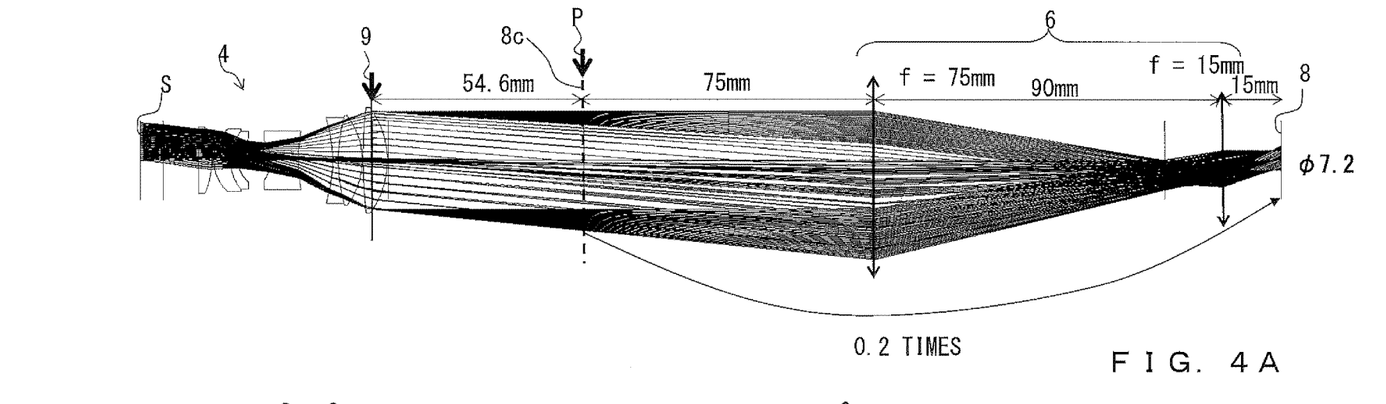
FIG. 4A illustrates a ray in a case in which a light receiving surface of a multi-photon excitation microscope illustrated in FIG. 1 is projected in an exit pupil position.
Figure 4B:
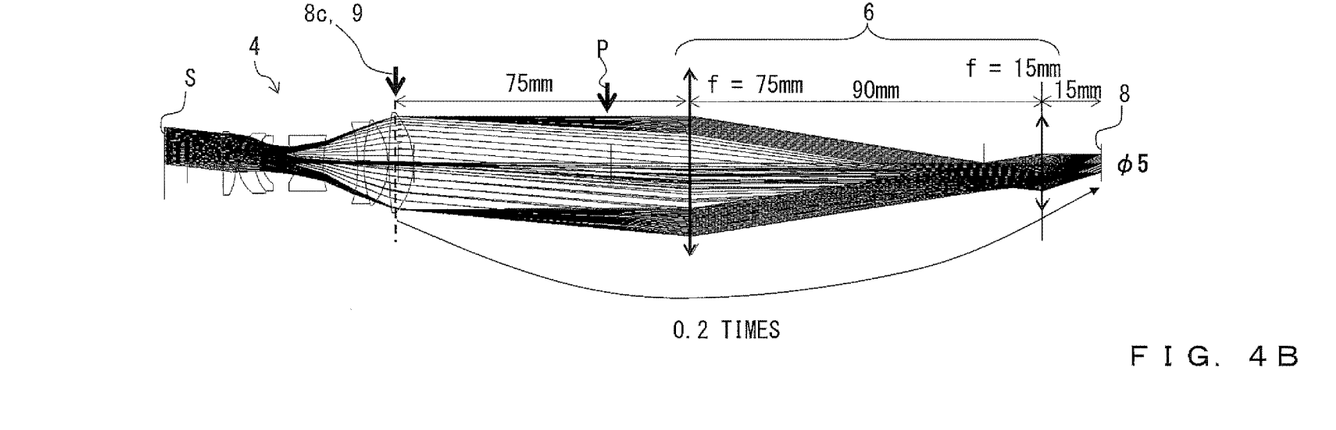
FIG. 4B illustrates a ray in a case in which the light receiving surface is projected on an objective mounting plane.

FIG. 4A and FIG. 4B compare a ray in a case in which the light receiving surface 8 is projected in the exit pupil portion P and a ray in a case in which the light receiving surface 8 is projected on the objective mounting plane 9. These figures illustrate an example in which the relay optical system 6 is configured of two lenses that are arranged so as to have a spacing of 90 mm and that respectively have focal lengths of 75 mm and 15 mm, and the light receiving surface 8 is arranged in a position that is 15 mm apart from a lens on the image side of the relay optical system 6. FIG. 4A illustrates a ray in a case in which the relay optical system 6 projects the light receiving surface 8 in the exit pupil position P at a projection magnification of 0.2 times. In this case, a light flux diameter of fluorescence on the light receiving surface 8 is 7.2 mm. FIG. 4B illustrates a ray in a case in which the relay optical system 6 projects the light receiving surface 8 on the objective mounting plane 9 at a projection magnification of 0.2 times. In this case, a light flux diameter of fluorescence on the light receiving surface 8 is 5 mm. The reference numeral 8c denotes a position in which the light receiving surface 8 is projected, namely, a plane that is optically conjugate with the light receiving surface (a conjugate plane). As illustrated in FIGS. 4A and 4B, a light flux diameter of fluorescence incident on the light receiving surface 8 can be reduced by projecting the light receiving surface 8 on the objective mounting plane 9, compared with a case in which the light receiving surface 8 is projected in the exit pupil position P. Therefore, fluorescence can be made incident on the light receiving surface 8 at a greater projection magnification than that in a case in which the light receiving surface 8 is projected in the exit pupil position P so as to reduce an incident angle of a ray to the light receiving surface 8.

Accordingly, vignetting can be effectively suppressed by configuring the objective 4 such that the exit pupil position P is located outside the objective 4 and arranging the dichroic mirror 3 between the objective 4 and the exit pupil position P, as in the multi-photon excitation microscope 10. An incident angle of a ray to the light receiving surface 8 can be reduced, and therefore the fluorescence detection efficiency of the PMT 7 can be improved.

Verification results of the above effects attained by using the dichroic mirrors 3 having different sizes are described below with reference to FIG. 5A to FIG. 8B.

Figure 5A:
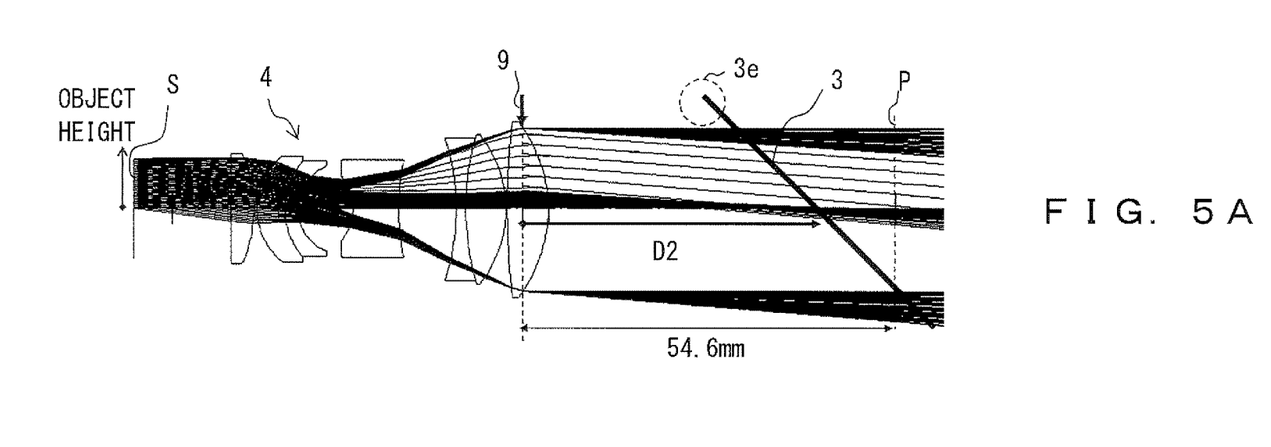
FIG. 5A illustrates a ray of fluorescence from the upper half of an object plane.
Figure 5B:
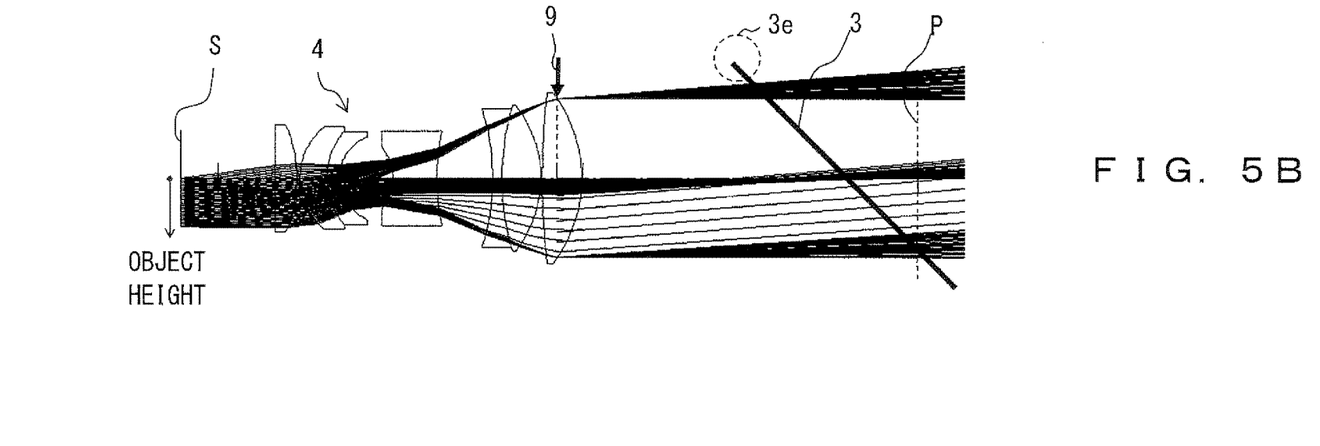
FIG. 5B illustrates a ray of fluorescence from the lower half of the object plane.
Figure 6A:
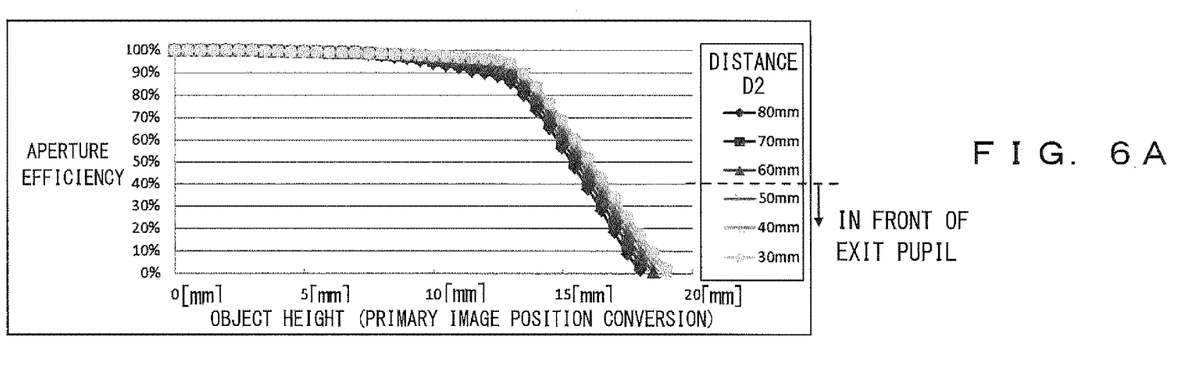
FIG. 6A illustrates aperture efficiency for fluorescence from the upper half of an object plane.
Figure 6B:
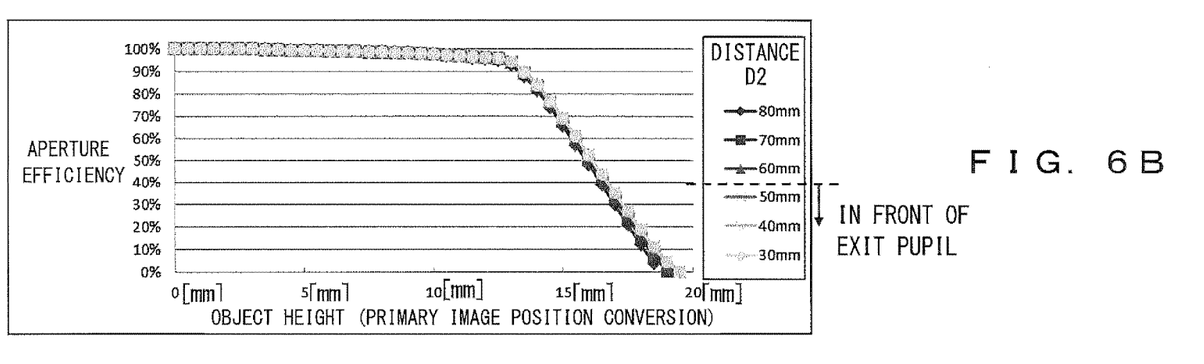
FIG. 6B illustrates aperture efficiency for fluorescence from the lower half of the object plane.

FIGS. 5A and 5B illustrate a ray of fluorescence detected by the PMT 7 in a case in which the size of the dichroic mirror 3 is greater than an exit pupil diameter of the objective 4. FIGS. 6A and 6B illustrate aperture efficiency of the multi-photon excitation microscope 10 in a case in which the size of the dichroic mirror 3 is greater than the exit pupil diameter of the objective 4. In FIGS. 5A, 5B, 6A, and 6B, D1 is 45 mm, and D1/√2 (≈32 mm) is greater than the exit pupil diameter (25.2 mm) of the objective 4.

Figure 7A:
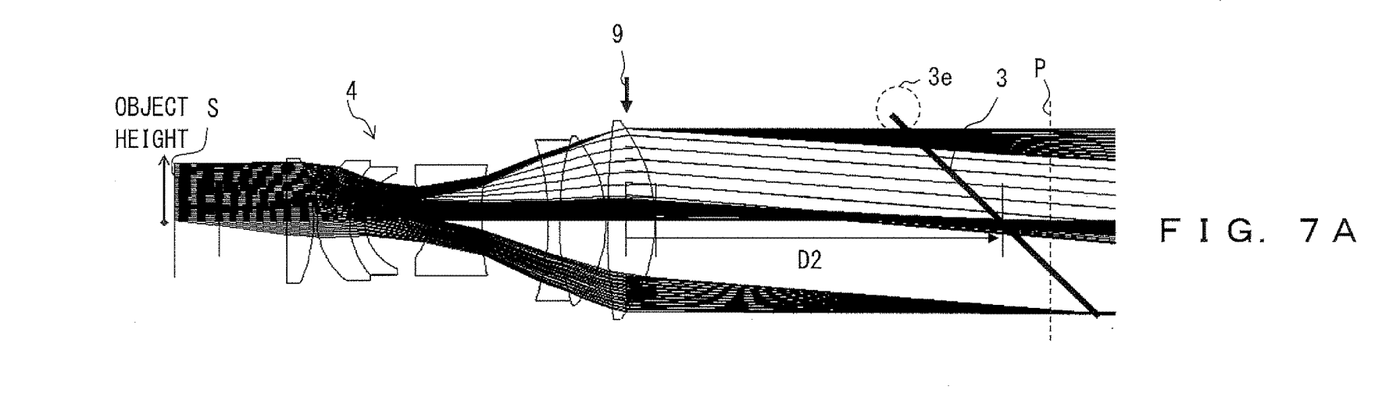
FIG. 7A illustrates a ray of fluorescence from the upper half of an object plane.
Figure 7B:
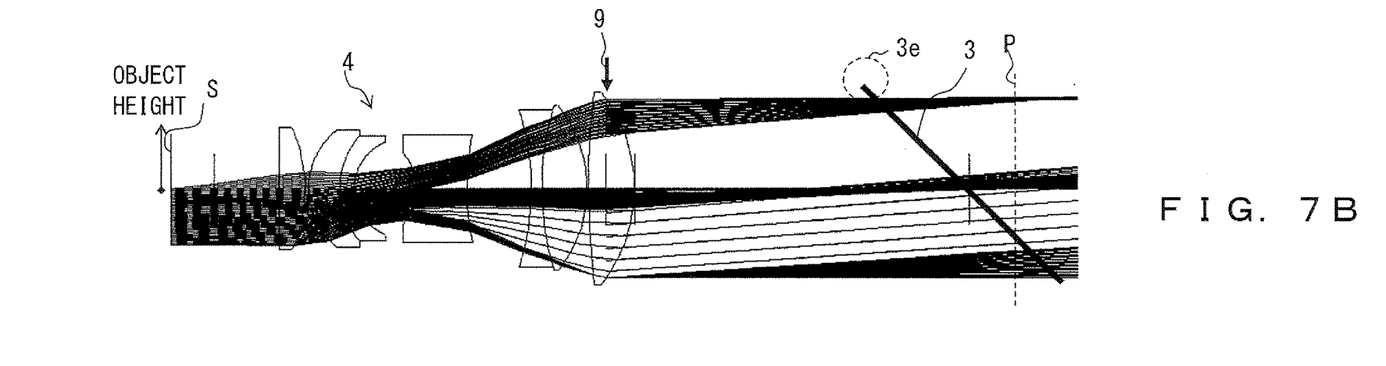
FIG. 7B illustrates a ray of fluorescence from the lower half of the object plane.
Figure 8A:
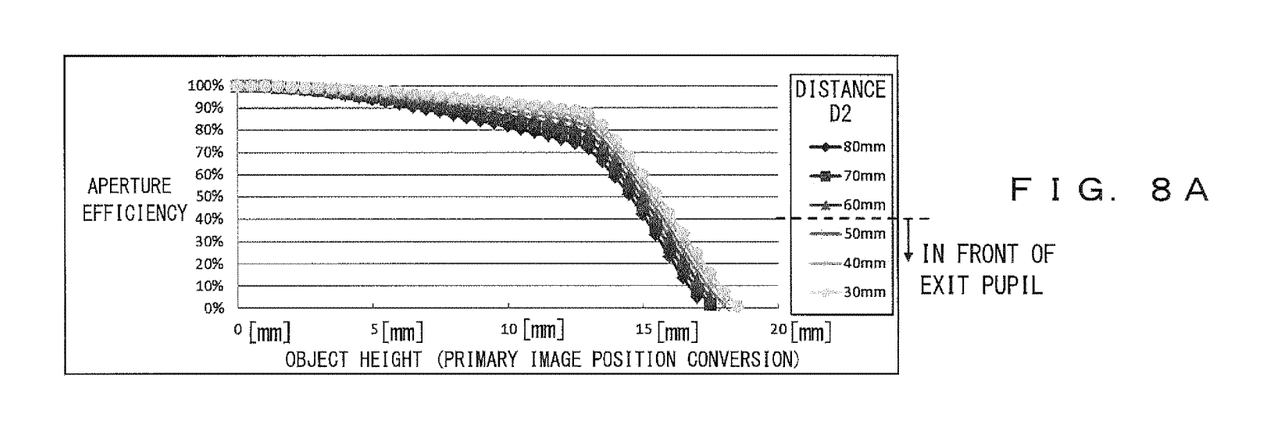
FIG. 8A illustrates aperture efficiency for fluorescence from the upper half of an object plane.
Figure 8B:
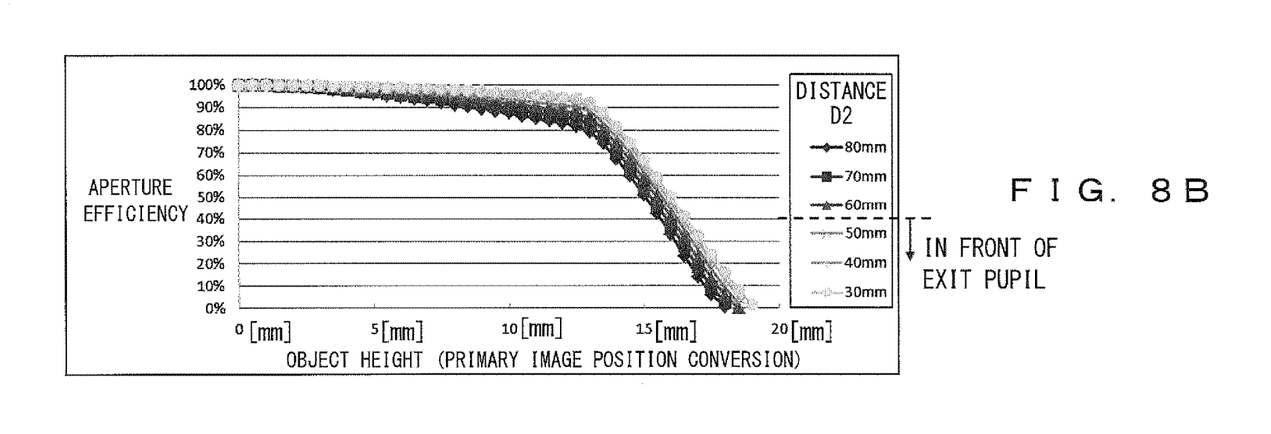
FIG. 8B illustrates aperture efficiency for fluorescence from the lower half of the object plane.

FIGS. 7A and 7B illustrate a ray of fluorescence detected by the PMT 7 in a case in which the size of the dichroic mirror 3 is approximately equal to the exit pupil diameter of the objective 4. FIGS. 8A and 8B illustrate aperture efficiency of the multi-photon excitation microscope 10 in a case in which the size of the dichroic mirror 3 is approximately equal to the exit pupil diameter of the objective 4. In FIGS. 7A, 7B, 8A, and 8B, D1 is 36 mm, and D1/√2 (≈25.5 mm) is approximately equal to the exit pupil diameter (25.2 mm) of the objective 4.

FIGS. 5A and 7A illustrate a ray of fluorescence from the upper half (one side of an optical axis) of an object plane, and FIGS. 5B and 7B illustrate a ray of fluorescence from the lower half (the other side of the optical axis) of the object plane. FIGS. 6A and 8A illustrate aperture efficiency for fluorescence from the upper half (one side of the optical axis) of an object plane. FIGS. 6B and 8B illustrate aperture efficiency for fluorescence from the lower half (the other side of the optical axis) of the object plane. The aperture efficiency is an index that indicates what amount of vignetting occurs in light emitted from the outside of an axis (off-axis light) with respect to light emitted on the axis (on-axis light), and as a value of aperture efficiency increases, a greater amount of vignetting is suppressed.

FIGS. 6A, 6B, 8A, and 8B illustrate that as a distance from the optical axis increases (namely, as an object height increases), aperture efficiency decreases, and that as the distance D2 decreases, the aperture efficiency is improved more greatly. This result shows that a greater amount of vignetting is suppressed by arranging the dichroic mirror 3 between the objective 4 and the exit pupil position P, compared with a case in which the dichroic mirror 3 is arranged in the exit pupil position P, regardless of the size of the dichroic mirror 3. The result also shows that a greater amount of vignetting is suppressed as the dichroic mirror 3 is arranged closer to the objective mounting plane 9 of the objective 4.

When FIGS. 6A, 6B, 8A, and 8B are compared, in FIGS. 8A and 8B in which the size of the dichroic mirror 3 is relatively small, the aperture efficiency of rays of fluorescence emitted from both the upper half and the lower half of the object plane is greatly improved by reducing the distance D2. In FIGS. 6A and 6B in which the size of the dichroic mirror 3 is relatively great, the aperture efficiency only of the ray of fluorescence emitted from the upper half of the object plane is greatly improved. However, fluctuation in the aperture efficiency of the ray of fluorescence emitted from the lower half of the object plane is small. This is because an end portion 3e of the dichroic mirror 3 in which the greatest amount of vignetting is likely to occur in the fluorescence emitted from the lower half of the object plane is sufficiently close to the objective when the size of the dichroic mirror 3 is relatively great.

Second Embodiment

Figure 9A:
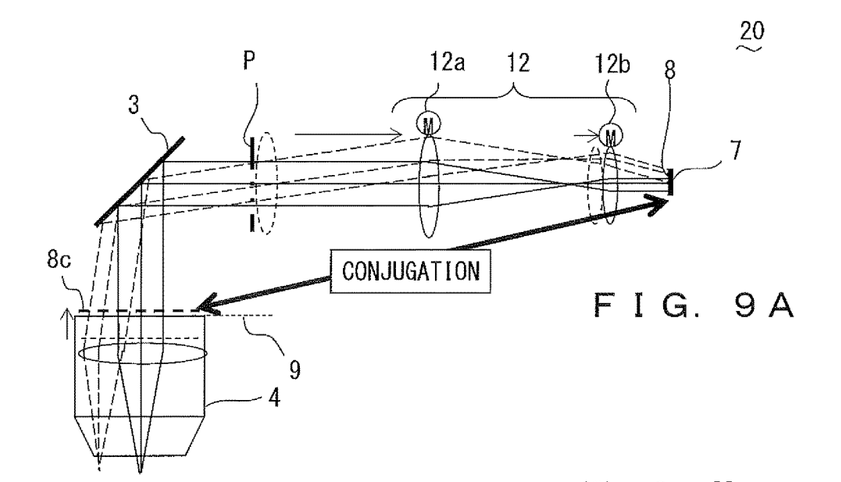
FIGS. 9A and 9B illustrate a configuration of a multi-photon excitation microscope in second embodiment of the present invention.
Figure 9B:
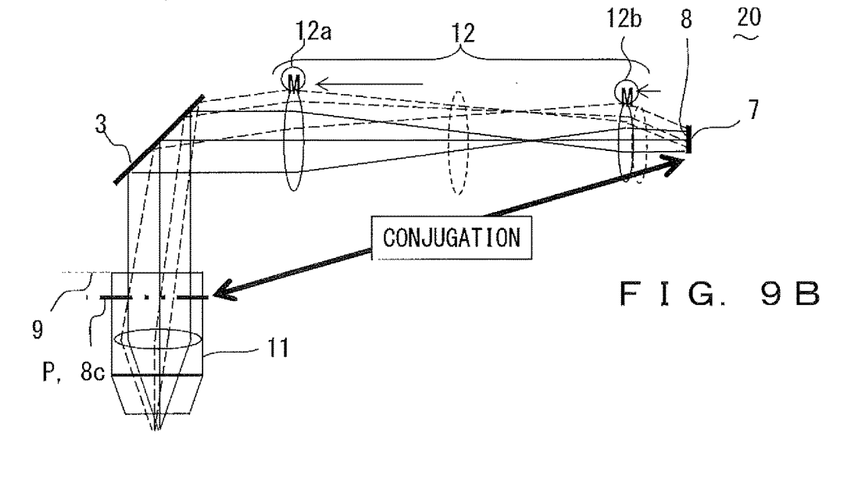

FIGS. 9A and 9B illustrate a configuration of a multi-photon excitation microscope 20 in this embodiment. In FIGS. 9A and 9B, an illumination system (the light source 1, the XY scanner 2, and the like) is omitted. The multi-photon excitation microscope 20 is different in that the multi-photon excitation microscope 20 includes a relay optical system 12, instead of the relay optical system 6. The other components of the multi-photon excitation microscope 20 are similar to those of the multi-photon excitation microscope 10.

The relay optical system 12 is the first relay optical system that guides fluorescence to the PMT 7, and is arranged between the exit pupil position P and the PMT 7. The relay optical system 12 is different from the relay optical system 6 in that the relay optical system 12 includes a structure of moving a lens configuring the relay optical system 12 in an optical axis direction. The relay optical system 12 is configured so as to adjust a position (the conjugate plane 8c) in which the light receiving surface 8 is projected between the sample S and the exit pupil position P by moving the lens configuring the relay optical system 12 in the optical axis direction. Namely, the relay optical system 12 includes the first adjustors 12a and 12b that adjust the position (the conjugate plane 8c) in which the light receiving surface 8 is projected.

The multi-photon excitation microscope 20 in this embodiment also enables vignetting of fluorescence caused by the dichroic mirror 3 to be effectively suppressed because the dichroic mirror 3 is arranged between the objective 4 and the exit pupil position P, as illustrated in FIG. 9A.

In addition, the multi-photon excitation microscope 20 can make the conjugate plane 8c coincide with the objective mounting plane 9, as illustrated in FIG. 9A, so as to project the light receiving surface 8 on the objective mounting plane 9.

When the objective 4 is replaced with a popular objective 11 that internally includes the exit pupil position P, the multi-photon excitation microscope 20 can make the conjugate plane 8c coincide with the exit pupil position P located within the objective 11, as illustrated in FIG. 9B. Accordingly, the multi-photon excitation microscope 20 enables vignetting to be effectively suppressed regardless of whether the objective 11 that internally includes the exit pupil position P or the objective 4 that externally includes the exit pupil position P is used. Because a position of the objective mounting plane 9 of an objective is generally fixed in a microscope, the exit pupil position P located within the objective 11 does not coincide with the objective mounting plane 9 of the objective 4.

Further, in this embodiment, the relay optical system 12 includes the first adjustors 12a and 12b; however, the multi-photon excitation microscope 20 may project the light receiving surface 8 in a position that corresponds to an objective to be used by replacing the relay optical system 12 with another relay optical system.

Third Embodiment

Figure 10A:
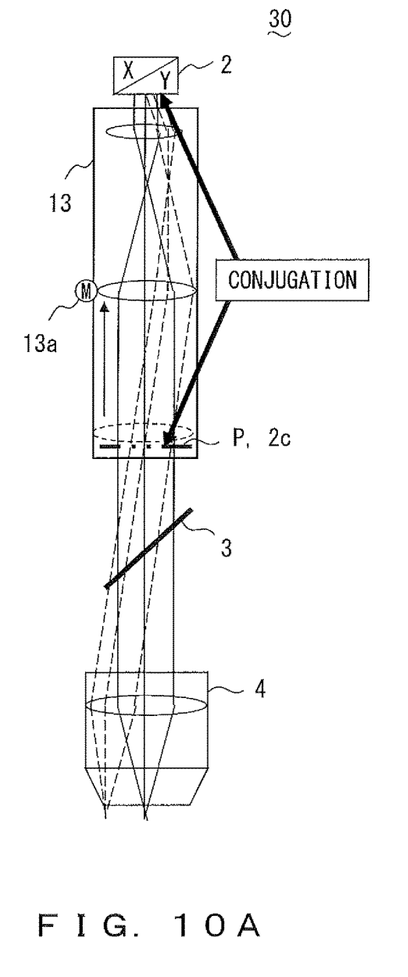
FIGS. 10A and 10B illustrate a configuration of a multi-photon excitation microscope in third embodiment of the present invention.
Figure 10B:
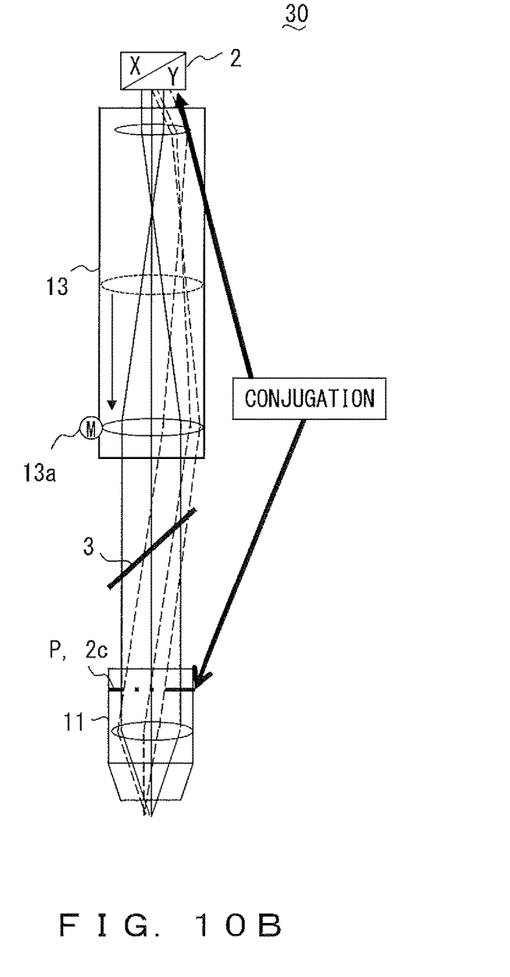

FIGS. 10A and 10B illustrate a configuration of a multi-photon excitation microscope 30 in this embodiment. In FIGS. 10A and 10B, a detection system (the non-confocal detection unit 5) is omitted. The multi-photon excitation microscope 30 is similar to the multi-photon excitation microscope 10 in that a relay optical system that projects the XY scanner 2 in the exit pupil position P is included between the XY scanner 2 and the dichroic mirror 3. However, a relay optical system 13 included in the multi-photon excitation microscope 30 is different from the relay optical system of the multi-photon excitation microscope 10 in that the relay optical system 13 is configured so as to adjust a position (a conjugate plane 2c) in which the XY scanner 2 is projected by moving a lens configuring the relay optical system 13 in an optical axis direction. Namely, the relay optical system 13 includes the second adjustor (a lens moving unit 13a) that adjusts the position in which the XY scanner 2 is projected.

The multi-photon excitation microscope 30 in this embodiment enables vignetting of fluorescence caused by the dichroic mirror 3 to be effectively suppressed, because the dichroic mirror 3 is arranged between the objective 4 and the exit pupil position P, as illustrated in FIG. 10A.

When the objective 4 is replaced with the objective 11, the multi-photon excitation microscope 30 can make the conjugate plane 2c coincide with the exit pupil position P located within the objective 11, as illustrated in FIG. 10B. Accordingly, the multi-photon excitation microscope 30 enables excitation light (a principal ray thereof) to be emitted from the objective to the sample S in parallel to an optical axis, regardless of whether the objective 11 that internally has the exit pupil position P or the objective 4 that externally has the exit pupil position P is used. In other words, the multi-photon excitation microscope 30 can scan the sample S on a condition whereby the objective is telecentric on the object side.

Further, the relay optical system 13 may be configured so as to be a zoom variable power optical system in which a projection magnification of the relay optical system 13 varies. In other words, the relay optical system 13 may include the lens moving unit 13a that is the second adjustor that adjusts a position in which the relay optical system 13 projects the XY scanner 2 and the third adjustor that adjusts the projection magnification of the relay optical system 13. In this case, the multi-photon excitation microscope 30 can change the projection magnification and make fluorescence incident on an objective with a light flux diameter that corresponds to a pupil diameter, even when an objective having a different pupil diameter is used instead.

Figure 11:
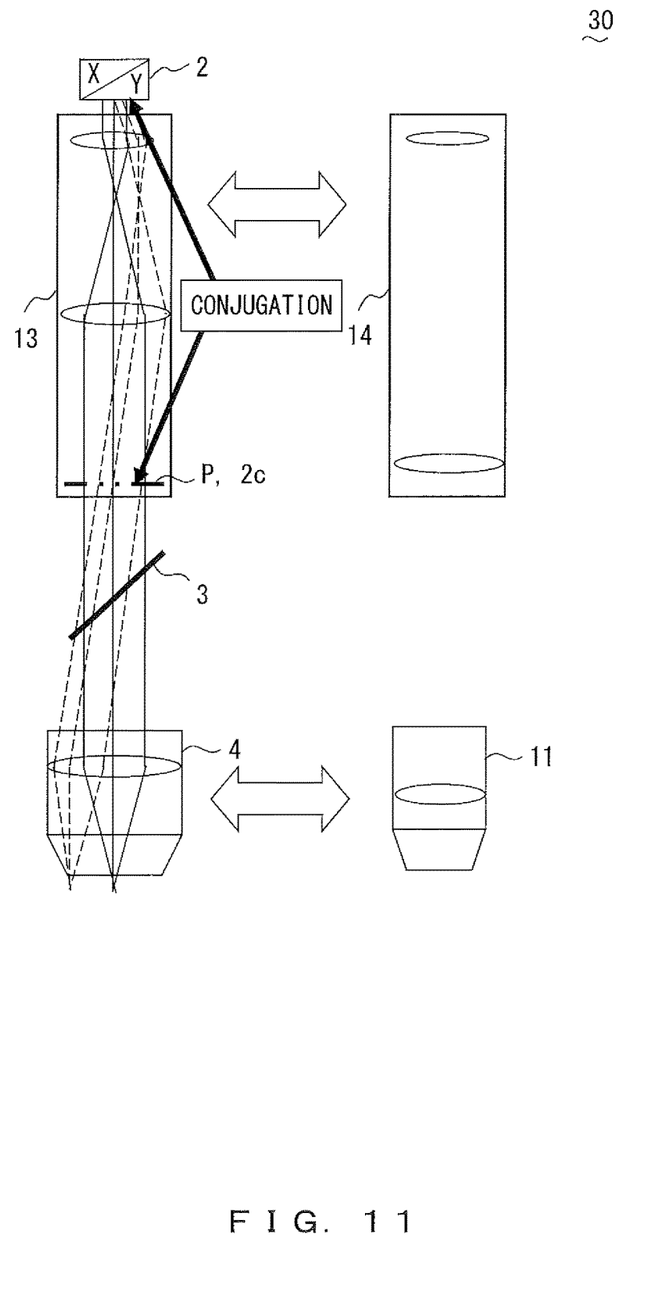
FIG. 11 illustrates a variation of a configuration of a multi-photon excitation microscope in third embodiment of the present invention.

In this embodiment, the relay optical system 13 includes the second adjustor; however, the multi-photon excitation microscope 30 may project the XY scanner 2 in the exit pupil position P of a used objective by replacing the relay optical system 13 with another relay optical system 14, as illustrated in FIG. 11.

The embodiments above give specific examples for easy understanding of the invention, and the present invention is not limited to the embodiments above. Various modifications or variations of a scanning microscope can be made without departing from the spirit of the present invention specified in the claims. Several features in the contexts of individual embodiments described in this specification may be combined so as to configure a single embodiment. As an example, the multi-photon excitation microscope 20 in Second embodiment may be modified so as to include the relay optical system 13 of the multi-photon excitation microscope 30.

What is claimed is:
1. A scanning microscope comprising:
a scanner that scans a sample with illumination light;

a first objective that externally has an exit pupil position and irradiates the sample with the illumination light deflected by the scanner;

a second objective that internally has an exit pupil position, the first objective being replaceable with the second objective;

a beam splitter that is arranged between the first objective and the exit pupil position thereof, and that reflects one of the illumination light and observation light from the sample, and transmits the other;

a non-descanned detector that detects the observation light via the first objective and the beam splitter, not via the scanner;

a first relay optical system that is arranged between the exit pupil position of the first objective and the non-descanned detector, and that projects a light receiving surface of the non-descanned detector between the sample and the exit pupil position of the first objective; and a first adjustor that, when the first objective is replaced by the second objective, adjusts a position in which the first relay optical system projects the light receiving surface of the non-descanned detector, so as to make the position coincide with the exit pupil position of the second objective.

2. The scanning microscope according to claim 1, further comprising:

a second relay optical system that projects the scanner in the exit pupil position of the first objective; and a second adjustor that, when the first objective is replaced by the second objective, adjusts a position in which the second relay optical system projects the scanner, so as to make the position coincide with the exit pupil position of the second objective.

3. The scanning microscope according to claim 2, further comprising:

a third adjustor that adjusts a projection magnification of the second relay optical system.

4. The scanning microscope according to claim 1, wherein the first relay optical system comprises a plurality of movable lenses.

* * * * *